United States Patent
Deaton et al.

(10) Patent No.: US 11,685,265 B2
(45) Date of Patent: Jun. 27, 2023

(54) VEHICLE TRAILER WITH PARASITIC CHARGING

(71) Applicants: Paul Deaton, Santa Clara, CA (US); Larry Deaton, Palm Beach Gardens, FL (US)

(72) Inventors: Paul Deaton, Santa Clara, CA (US); Larry Deaton, Palm Beach Gardens, FL (US)

(*) Notice: Subject to any disclaimer, the term of this patent is extended or adjusted under 35 U.S.C. 154(b) by 745 days.

(21) Appl. No.: 16/689,061

(22) Filed: Nov. 19, 2019

(65) Prior Publication Data
US 2020/0276904 A1 Sep. 3, 2020

Related U.S. Application Data

(60) Provisional application No. 62/811,857, filed on Feb. 28, 2019.

(51) Int. Cl.
*B60L 15/20* (2006.01)
*B60K 7/00* (2006.01)
(Continued)

(52) U.S. Cl.
CPC ........ *B60L 15/2009* (2013.01); *B60K 7/0007* (2013.01); *B60L 7/10* (2013.01);
(Continued)

(58) Field of Classification Search
CPC .... B60L 15/2009; B60L 7/10; B60L 15/2081; B60L 2200/28; B60K 7/0007
(Continued)

(56) References Cited

U.S. PATENT DOCUMENTS

| 4,313,080 A * | 1/1982 | Park .................. B60L 53/11 |
| | | 180/65.225 |
| 2007/0193795 A1* | 8/2007 | Forsyth ................ B60L 50/50 |
| | | 180/65.285 |

(Continued)

FOREIGN PATENT DOCUMENTS

WO   WO-2019053025 A1 *  3/2019  .............. B60K 1/00

OTHER PUBLICATIONS

Weiss, "Dethleffs put a new spin on towing with an electric camping trailer that nearly drives itself", retrieved from the Internet: <https://newatlas.com/dethleffs-electric-coco-caravan/56056>, retrieved Nov. 18, 2019, New Atlas, dated Aug. 24, 2018 (10 pages).

(Continued)

*Primary Examiner* — Charles A Fox
*Assistant Examiner* — Michael E Butler
(74) *Attorney, Agent, or Firm* — Darrow Mustafa PC

(57) ABSTRACT

A trailer can be configured to selectively provide powered wheels, energy recovery, and/or parasitic power source charging. A trailer-related trigger (drive activation trigger, an energy recovery trigger, or a parasitic charging trigger) can be detected. When a drive activation trigger is detected, one or more motors can be activated to power one or more wheels of the trailer, thereby providing extra pushing power. When an energy recovery trigger is detected, one or more power sources of the trailer can be charged by recovering energy from the trailer. When a parasitic charging trigger is detected, one or more power sources of the trailer can be charged using a portion of the power generated by a main vehicle operatively connected to the trailer.

8 Claims, 4 Drawing Sheets

(51) Int. Cl.
   *B60L 7/10*      (2006.01)
   *B60L 50/40*     (2019.01)
   *B60L 50/60*         (2019.01)
(52) U.S. Cl.
   CPC ........... *B60L 15/2081* (2013.01); *B60L 50/40* (2019.02); *B60K 2007/0092* (2013.01); *B60L 50/66* (2019.02); *B60L 2200/28* (2013.01)
(58) Field of Classification Search
   USPC .......................................................... 701/22
   See application file for complete search history.

(56)                References Cited

U.S. PATENT DOCUMENTS

2010/0252339 A1\* 10/2010 Bibeau ..................... B60K 6/48
                                                          180/11
2019/0233034 A1\*  8/2019 Viele ....................... B62D 59/04
2021/0016678 A1\*  1/2021 Healy .................. B60W 20/14

OTHER PUBLICATIONS

Digi-Key Electronics, "BMOD0500 P016 B01 Maxwell Technologies Inc.", retrieved from the Internet: <https://www.digikey.com/product-detail/en/maxwell-technologies-inc/BMOD0500%2520P016%2520B01/1182-1028-ND/3079292&?gclid=EAlalQobChMIwMKxzPqT4wIVI6DsCh39JQSREAQYASABEgITYPD_BwE>, retrieved Nov. 18, 2019 (2 pages).

Dethleffs, "From vision to reality", retrieved from the Internet: <https://www.dethleffs.co.uk/actueel/from-vision-to-reality/>, retrieved Nov. 18, 2019 (4 pages).

\* cited by examiner

VEHICLE TRAILER WITH PARASITIC CHARGING

CROSS-REFERENCE TO RELATED APPLICATIONS

This application claims the benefit of U.S. Provisional Application No. 62/811,857, filed on Feb. 28, 2019, which is incorporated herein by reference in its entirety.

FIELD

The subject matter described herein relates in general to vehicles and, more particularly, to trailers for a vehicle.

BACKGROUND

A trailer is typically an unpowered vehicle that is towed by a powered vehicle. Trailers are used for a variety of personal or commercial purposes. For instance, trailers are used for the transport of goods and materials.

SUMMARY

In one respect, the present disclosure is directed to a trailer. The trailer can include one or more power sources. The trailer can include one or more motors operatively connected to receive electrical energy from the one or more power sources. The trailer can include one or more wheels. The wheel(s) can be operatively connected to the motor(s) for selectively powering the wheel(s). The trailer can include one or more processors operatively connected to the motor(s). The processor(s) can be configured to detect a trailer-related trigger. The trailer-related trigger can be a drive activation trigger, an energy recovery trigger, and/or a parasitic charging trigger. The processor(s) can be configured to, responsive to detecting a drive activation trigger, activate the motor(s) to power the wheel(s). Alternatively or additionally, the processor(s) can be configured to, responsive to detecting an energy recovery trigger, cause the power source(s) to be charged by recovering energy from the trailer. Alternatively or additionally, the processor(s) can be configured to, responsive to detecting a parasitic charging trigger, cause the power source(s) to be charged using power generated by a main vehicle operatively connected to the trailer.

In another respect, the present disclosure is directed to a method for a trailer. The trailer can include one or more power sources, one or more motors operatively connected to receive electrical energy from the power source(s), and one or more wheels operatively connected to the motor(s) for selectively powering the one or more wheel(s). The method can include detecting a trailer-related trigger. The trailer-related trigger can be a drive activation trigger, an energy recovery trigger, and/or a parasitic charging trigger. The method can include, responsive to detecting a drive activation trigger, activating the motor(s) to power the wheel(s). The method can include, responsive to detecting an energy recovery trigger, causing the power source(s) to be charged by recovering energy from the trailer. The method can include, responsive to detecting a parasitic charging trigger, causing the power source(s) to be charged using power generated by a main vehicle operatively connected to the trailer.

DETAILED DESCRIPTION

Figure 1:
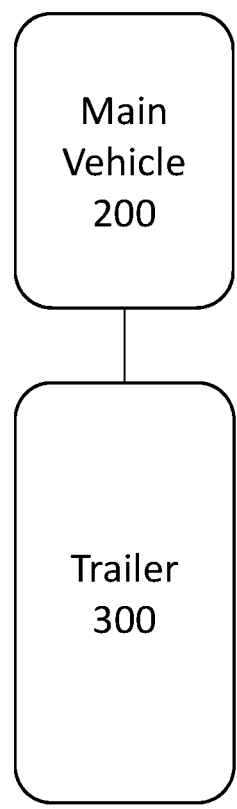
FIG. 1 is an example of a main vehicle and trailer system.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The system 100 can include a main vehicle 200 and a trailer 300. The main vehicle 200 can be operatively connected to the trailer 300. The main vehicle 200 and the trailer 300 can be operatively connected to each other in any suitable manner to keep them together while in motion. The term "operatively connected," as used throughout this description, can include direct or indirect connections, including connections without direct physical contact. As an example, the trailer 300 can be operatively connected to the main vehicle 200 in a mechanical manner, such as by any suitable type of hitch, now known or later developed. Further examples of a mechanical connection include a chain, rope, bar, three-point, fifth wheel, coupling, drawbar, or integrated platform.

As another example, the trailer 300 can be operatively connected to the main vehicle 200 in an electrical manner, using any suitable form of electrical connection, now known or later developed. For instance, there can be an electrical connection between the main vehicle 200 and the trailer 300, such as for the brake lights and/or turn signals.

Further, one or more elements of the main vehicle 200 can be communicatively linked to the trailer 300 and/or one or more elements of the trailer 300 through one or more communication networks. As used herein, the term "communicatively linked" can include direct or indirect connections through a communication channel or pathway or another component or system. A "communication network" means one or more components designed to transmit and/or receive information from one source to another. One or more of the elements of the main vehicle 200 and/or one or more elements of the trailer 300 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Figure 2:
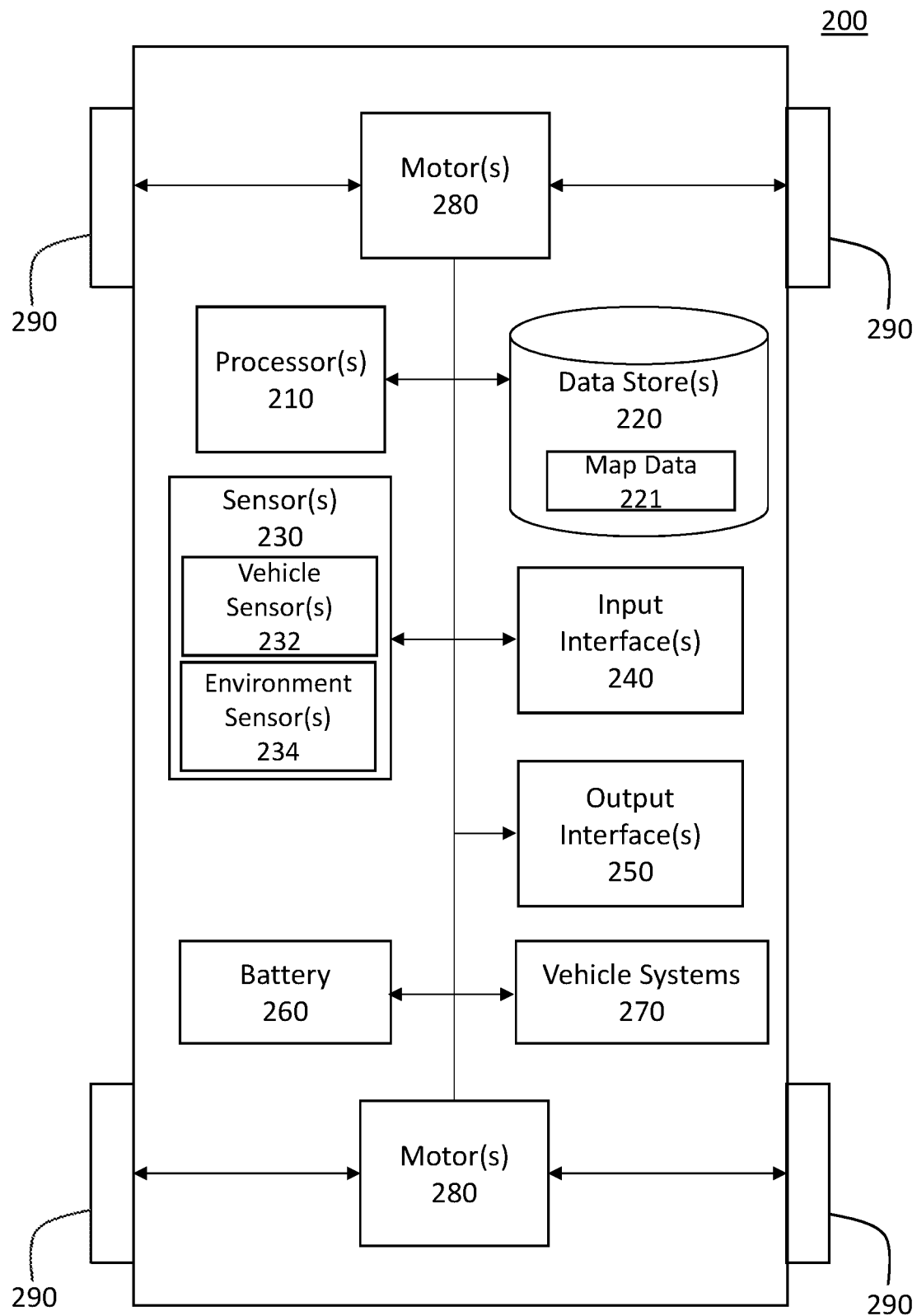
FIG. 2 is an example of a main vehicle.

Referring to FIG. 2, an example the main vehicle 200 is shown. As used herein, "main vehicle" means any form of motorized transport. The main vehicle 200 can be a land-based vehicle. In one or more implementations, the main vehicle 200 can be an automobile, a semi-trailer truck, a tractor-trailer, a truck, a pick-up truck, a sports utility vehicle, a minivan, a car, or another other vehicle that can tow, pull, or haul a trailer.

In one or more arrangements, the main vehicle 200 can be an autonomous vehicle in which one or more computing systems are used to navigate and/or maneuver the vehicle along a travel route with minimal or no input from a human driver. In one or more arrangements, the main vehicle 200 can be highly automated or completely automated. The main vehicle 200 can be semi-autonomous vehicle in which a portion of the navigation and/or maneuvering of the vehicle along a travel route is performed by one or more computing systems, and a portion of the navigation and/or maneuvering of the vehicle along a travel route is performed by a human driver. The main vehicle 200 can be a manual vehicle in which all of or a majority of the navigation and/or maneuvering of the vehicle is performed by a human driver. In some arrangements, the main vehicle 200 may operate in only one of these operational modes. In some arrangements, the main vehicle 200 can be configured to be switched between the various operational modes, including any of those mentioned above.

The main vehicle 200 can include various elements. Some of the possible elements of the main vehicle 200 are shown in FIG. 2 and will now be described. However, it will be understood that it is not necessary for the main vehicle 200 to have all of the elements shown in FIG. 2 or described herein. The main vehicle 200 can have any combination of the various elements shown in FIG. 2. Further, the main vehicle 200 can have additional elements to those shown in FIG. 2. In some arrangements, the main vehicle 200 may not include one or more of the elements shown in FIG. 2. Further, the elements shown may be physically separated by large distances. In some arrangements, one or more of the elements shown in FIG. 2 may be located onboard the main vehicle 200, the trailer 300, or in a remote location.

The main vehicle 200 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, relay logic, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other.

The main vehicle 200 can include one or more data stores 220 for storing one or more types of data. The data store(s) 220 can include volatile and/or non-volatile memory. Examples of suitable data stores 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 220 can be a component of the processor(s) 210, or the data store(s) 220 can be operatively connected to the processor(s) 210 for use thereby.

In one or more arrangements, the one or more data stores 220 can include map data 221. The map data 221 can include maps of one or more geographic areas. In some instances, the map data 221 can include information or data on roads, traffic control devices, road markings, road grade, structures, features, and/or landmarks in the one or more geographic areas. In one or more arrangement, the map data 221 include information about the ground, terrain, elevation, roads, surfaces, and/or other features of one or more geographic areas. The map data 221 can include measurements, dimensions, distances, and/or information for one or more items included in the map data 221. The map data 221 can include information or data on road geometry.

In some instances, at least a portion of the map data 221 can be located in one or more data stores 220 located onboard the main vehicle 200. Alternatively or in addition, at least a portion of the map data 221 can be located in one or more data stores that are located remote from the main vehicle 200, such as on a remote server. The remote server can be communicatively linked to the main vehicle 200. The data store(s) 220 can be communicatively linked to one or more elements of the main vehicle 200 by one or more communication networks.

As noted above, the main vehicle 200 can include one or more sensors 230. "Sensor" means any device, component and/or system that can detect, determine, assess, monitor, measure, quantify and/or sense something. The sensor(s) 230 can detect, determine, assess, monitor, measure, quantify and/or sense in real-time. As used herein, the term "real-time" means a level of processing responsiveness that a user or system senses as sufficiently immediate for a particular process or determination to be made, or that enables a processor to process data at substantially the same rate as some external process or faster.

In arrangements in which the main vehicle 200 includes a plurality of sensors 230, the sensors 230 can work independently from each other. Alternatively, two or more of the sensors 230 can work in combination with each other. In such case, the two or more sensors 230 can form a sensor network. The sensor(s) 230 can be operatively connected to the processor(s) 210, the data store(s) 220, and/or other element of the main vehicle 200 (including any of the elements shown in FIG. 2).

The main vehicle 200 can include any suitable type of sensor. Various examples of different types of sensors will be described herein. However, it will be understood that the embodiments are not limited to the particular sensors described.

The main vehicle 200 can include one or more vehicle sensors 232. The vehicle sensor(s) 232 can acquire, capture, detect, determine, assess, monitor, measure, quantify, and/or sense information or data about the main vehicle 200 itself (e.g., position, orientation, speed, pedal positions, etc.) and changes thereto. The vehicle sensor(s) 232 can be any sensor, now known or later developed. In one or more arrangements, the vehicle sensor(s) 232 can include one or more accelerometers, one or more gyroscopes, one or more inertial measurement units (IMU), one or more global navigation satellite systems (GNSS), one or more global positioning systems (GPS), one or more speedometers, one or more yaw rate sensors, one or more attitude angle sensors, one or more RPM sensors, one or more weight sensors, one or more load sensors, one or more tire pressure sensors, one or more accelerator pedal position or pressure sensors, one or more brake pedal position or pressure sensors, and/or other suitable sensors. In one or more arrangements, the vehicle sensor(s) 232 can acquire, capture, detect, determine, assess, monitor, measure, quantify, and/or sense vehicle acceleration, vehicle deceleration, and/or whether the vehicle is stopped. The vehicle sensor(s) 232 can acquire, capture, detect, determine, assess, monitor, measure, quantify, and/or sense vehicle orientation (e.g., whether the vehicle is in a substantially horizontal orientation, whether the vehicle is traveling uphill, whether the vehicle is traveling downhill, etc.).

The main vehicle 200 can include one or more environment sensors 234 configured to acquire, detect, determine, assess, monitor, measure, quantify, and/or sense data or information about the external environment in which a vehicle is located or one or more portions thereof. The environment sensor(s) 234 can be any sensor, now known or later developed. Non-limiting examples of environment sensors 234 include one or more radar sensors, one or more LIDAR sensors, one or more sonar sensors, and/or one or more cameras. The environment sensor(s) 234 can acquire, capture, detect, determine, assess, monitor, measure, quantify, and/or sense road geometry (e.g., whether the road is substantially horizontal, whether the road is inclined, etc.).

The main vehicle 200 can include one or more input interfaces 240. An "input interface" includes any device, component, system, element or arrangement or groups thereof that enable information/data to be entered into a machine. The input interface(s) 240 can receive an input from a user (e.g., a person) or other entity. Any suitable input interface(s) 240 can be used, including, for example, a keypad, display, touch screen, multi-touch screen, button, joystick, mouse, trackball, microphone and/or combinations thereof.

The main vehicle 200 can include one or more output interfaces 250. An "output interface" includes any device, component, system, element or arrangement or groups thereof that enable information/data to be presented to a user (e.g., a person) or other entity. The output interface(s) 250 can present information/data to a user or other entity. The output interface(s) 250 can include a display, an earphone, haptic device, and/or speaker. Some components of the main vehicle 200 may serve as both a component of the input interface(s) 240 and a component of the output interface(s) 250.

The main vehicle 200 can include one or more vehicle systems 270. For instance, the vehicle systems 270 can include a propulsion system, a braking system, a steering system, throttle system, a transmission system, a signaling system, a navigation system, or any combination thereof. Each of these systems can include one or more mechanisms, devices, elements, components, systems, and/or combination thereof, now known or later developed. The main vehicle 200 can include one or more actuators. The actuator(s) can be used to modify, adjust and/or alter one or more of the vehicle systems 270 of the main vehicle 200, or components thereof, responsive to receiving signals or other inputs from the processor(s) 210 and/or other element(s) of the main vehicle 200. The actuator(s) can include motors, pneumatic actuators, hydraulic pistons, relays, solenoids, and/or piezoelectric actuators, just to name a few possibilities.

In one or more arrangements, the main vehicle 200 can be an electric vehicle. In one or more arrangements, the main vehicle 200 can be a fully electric vehicle, a primarily electric vehicle, or a hybrid electric vehicle. Thus, the main vehicle 200 can have any suitable drive system, now known or later developed. The main vehicle 200 can include one or more engines, one or more electric motors, and/or one or more batteries 260.

In one or more arrangements, the main vehicle 200 can include any suitable braking system, now know or later developed. For instance, the main vehicle 200 can be configured for regenerative braking. Generally, regenerative braking allows some of the kinetic energy of the main vehicle 200 to be recaptured and converted into electrical energy. This electrical energy can be used to recharge one or more batteries 260 of the main vehicle 200. One or more wheels 290 of the main vehicle 200 can be driven by one or more electric motors 280. The electric motor(s) 280 can be operated in reverse to be used as a generator when using regenerative braking, and its output can be supplied to the batteries 260. The transfer of energy to the batteries 260 can provide a braking effect.

Figure 3:
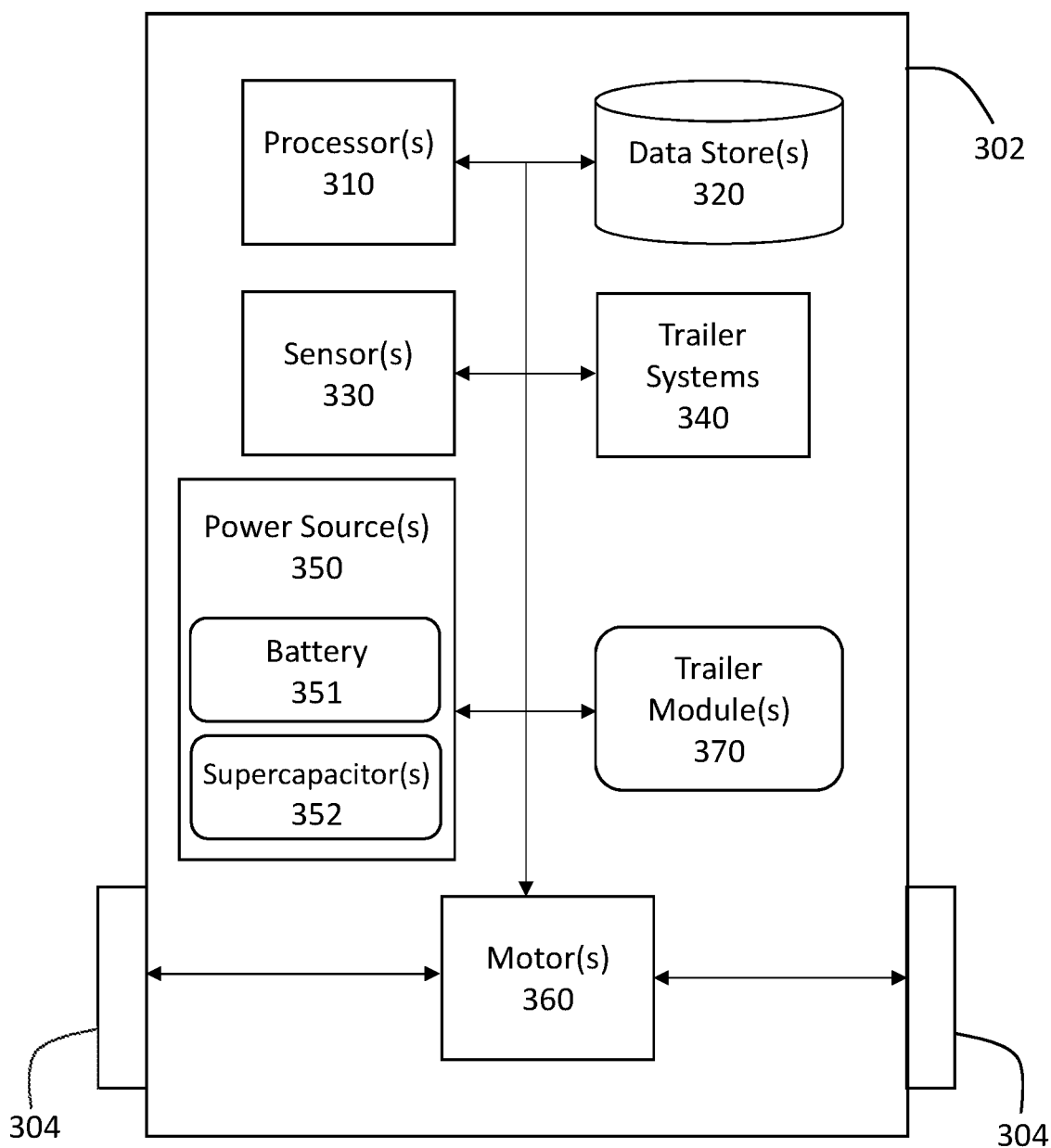
FIG. 3 is an example of a trailer configured to provide selectively powered wheels, energy recovery, and/or parasitic charging.

Referring to FIG. 3, an example of a trailer 300 is shown. A "trailer" includes an apparatus that is configured to be towed, pulled, and/or hauled by another powered vehicle. The trailer 300 can be used for various purposes, such as to store and/or transport various items, goods, materials, and/or things. Non-limiting examples of the trailer 300 include a full-trailer, a semi-trailer, a horse trailer, a livestock trailer, a flatbed trailer, a travel trailer, and a boat trailer. The trailer 300 can be any type of trailer, now known or later developed. The trailer 300 can be a semi-passive form of transport in that the trailer 300 may include components or groups of components that can facilitate it being towed, pulled, and/or hauled by another powered vehicle, but the trailer 300 may not be independently operated as a vehicle.

The trailer 300 can include various elements. Some of the possible elements of the trailer 300 are shown in FIG. 3 and will now be described. However, it will be understood that it is not necessary for the trailer 300 to have all of the elements shown in FIG. 3 or described herein. The trailer 300 can have any combination of the various elements shown in FIG. 3. Further, the trailer 300 can have additional elements to those shown in FIG. 3. In some arrangements, the trailer 300 may not include one or more of the elements shown in FIG. 3. Further, the elements shown may be physically separated by large distances. In some arrangements, one or more of the elements shown in FIG. 3 may be located onboard the trailer 300, the main vehicle 200, or in a remote location. One or more elements of the trailer 300 can be operatively connected to the main vehicle 200 and/or one or more elements of the main vehicle 200.

The trailer 300 can include a body 302, which can have any suitable configuration. For example, the body 302 can be enclosed, open, or partially open. The trailer 300 can include a plurality of wheels 304. The wheels 304 can be provided in pairs. While FIG. 3 shows the trailer 300 as having two wheels 304, it will be appreciated that the trailer 300 can have more than two wheels 304. The plurality of wheels 304 can be distributed on the trailer 300 in any suitable manner. In some arrangements, the wheels 304 can be non-powered. The wheels 304 can facilitate the movement of the trailer 300 while being towed by the main vehicle 200. However, according to arrangements herein, one or more wheels 304 of the trailer 300 can be configured to be selectively powered to support the towing, pulling, and/or hauling by the main vehicle 200, as will be explained in greater detail herein. As an example, a rearmost pair of wheels 304 of the trailer 300 can be configured to be selectively powered. As another example, a non-rearmost pair of wheels 304 of the trailer 300 can be configured to be selectively powered. In some arrangements, a plurality of pairs of wheels 304 of the trailer 300 can be configured to be selectively powered.

The trailer 300 can include one or more processors 310, one or more data stores 320, and/or one or more sensors 330. The above discussion of the processor(s) 210, data store(s) 220 (including map data 221), and the sensor(s) 230 made in connection with the main vehicle 200 applies equally to the processor(s) 310, the data store(s) 320, and the sensor(s) 330 of the trailer 300. It will be appreciated that the data store(s) 320 can include map data (as described above with map data 221) and/or different data, such as data relating to the trailer 300. Further, the sensors 330 can include sensors that relate to the trailer 300.

The trailer 300 can include one or more trailer systems 340. For example, the trailer system(s) 340 can include a propulsion system, a braking system, a transmission system, and/or a signaling system. Each of these systems can include one or more mechanisms, devices, elements, components, systems, and/or combination thereof, now known or later developed. However, it will be appreciated that the trailer 300 can include more, fewer, or different trailer systems. It should be appreciated that although particular trailer systems are separately defined, each or any of the systems or portions thereof may be otherwise combined or segregated via hardware and/or software within the trailer 300.

The wheels 304 of the trailer 300 can be allowed to passively rotate in response to being pulled by the main vehicle 200. However, for the wheels that are selectively powered, the trailer 300 can include any suitable system for powering such wheels, now known or later developed. For example, the trailer 300 can include one or more motors 360, which can be electric motors. The motor(s) 360 can be operatively connected to the wheels 304 in any suitable manner, now known or later developed. Thus, the power generated by the motor(s) 360 can be transferred to the wheels 304 to cause them to rotate.

The motor(s) 360 can be powered in any suitable manner. For instance, the motor(s) 360 can be operatively connected to one or more power sources 350. The power source(s) 350 can be any suitable source of energy for powering the motor(s) 360 to power one or more wheels 304 of the trailer 300. In one or more arrangements, the power source(s) 350 can include one or more batteries 351. The one or more batteries 351 can be rechargeable. While one or more batteries 351 are provided as an example, it should be understood that any power source capable of energizing an electric motor could be used. As an example, the power source(s) 350 can include one or more supercapacitors 352.

The trailer 300 can include one or more modules, at least some of which will be described herein. The modules can be implemented as computer readable program code that, when executed by a processor, implement one or more of the various processes described herein. One or more of the modules can be a component of the processor(s) 310, or one or more of the modules can be executed on and/or distributed among other processing systems to which the processor(s) 310 is operatively connected. The modules can include instructions (e.g., program logic) executable by one or more processor(s) 310. Alternatively or in addition, the data store(s) 320 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In one or more arrangements, the trailer 300 can include one or more trailer modules 370. The trailer module(s) 370 can be configured for various purposes relating to the trailer 300. For instance, the trailer module(s) 370 can be configured to detect one or more drive activation triggers for when to power one or more wheels 304 of the trailer 300. Examples of such drive activation triggers include, for example, uphill travel or accelerating from a stop. Such drive activation triggers can be detected based on sensor data acquired by the sensor(s) 330, the sensor(s) 230, and/or map data. Another example of a drive activation trigger is a user command. A user can provide a command on the input interface(s) 240, which can be located, for example, within the cabin of the main vehicle 200. The command can indicate that drive assistance should be provided to one or more wheels 304 of the trailer 300.

When a drive activation trigger is detected, the trailer module(s) 370 can be configured to cause one or more wheels 304 of the trailer 300 to be powered. For instance, the trailer module(s) 370 can be configured to allow the batteries 351, supercapacitors 352, and/or other power source(s) 350 to supply electrical energy to the motor(s) 360. By activating the motor(s) 360, extra pushing power (torque) is provided to the wheels 304 of the trailer 300 to assist the trailer 300 and, thus, the main vehicle 200 in getting up and over a hill or with accelerating from a stop. In some arrangements, the trailer module(s) 370 can be configured to cause a predetermined amount of power to be supplied to the wheels 304 of the trailer 300. Alternatively, the trailer module(s) 370 can be configured to determine an appropriate amount of power to be supplied to the wheels 304 based on real-time conditions. The trailer module(s) 370 can make such a determination in any suitable manner, such as by taking into account a current road incline, a current load of the trailer 300, a detectable amount of tension or compression from the main vehicle 200 applied to the trailer 300, and/or one or more performance parameters of the main vehicle 200, just to name a few possibilities.

The trailer module(s) 370 can be configured to recover energy from the trailer 300. For instance, the trailer module(s) 370 can be configured to detect various energy recovery triggers for when to selectively cause energy to be recovered from the wheels 304 of the trailer 300. Examples of such energy recovery triggers include downhill travel of the trailer 300 and/or during stopping. Such energy recovery triggers can be detected based on, for example, sensor data acquired by the sensor(s) 330 and/or the sensor(s) 230. Another example of an energy recovery trigger is a user command. A user can provide a command on the input interface(s) 240, which can be located, for example, within the cabin of the main vehicle 200. The command can indicate that energy of the wheels 304 of the trailer 300 should be recovered.

When an energy recovery trigger is detected, the trailer module(s) 370 can be configured to cause the motor(s) 360 to be deactivated and cause the wheels 304 to turn into an energy recovery system. For instance, the motor(s) 360 can be caused to run in reverse, such as by using the vehicle's momentum as the mechanical energy to do so. As a result, the motor(s) 360 are effectively turned into generators. The energy generated by the motor(s) 360 can be fed back into the batteries 351, supercapacitors 352, and/or other power source(s) 350. Thus, the trailer module(s) 370 can allow the batteries 351, supercapacitors 352, and/or other power source(s) 350 to be recharged by the energy generated by the motor(s) 360. This recovered energy can be stored for future use to provide drive assistance to the trailer 300 on the next hill or when accelerating from a stop. The transfer of energy to the batteries 351, supercapacitors 352, and/or other power source(s) 350 can provide a braking effect. The energy recovery process can also reduce the load on the brakes of the main vehicle 200 and/or the trailer 300. Thus, the trailer 300 can operate like a regenerative braking system.

The trailer module(s) 370 can be configured to parasitically charge the batteries 351, supercapacitors 352, and/or other power source(s) 350 of the trailer 300 using power from the main vehicle 200. For instance, the trailer module(s) 370 can be configured to detect various parasitic charging triggers. Examples of such parasitic charging triggers include, for example, when the main vehicle 200 is on a substantially horizontal surface. In such case, there is generally more than enough power for the main vehicle 200 to pull the load. Therefore, by tapping a portion of that pulling power and using it to "top off" the batteries 351, supercapacitors 352, and/or other power source(s) 350 of the trailer 300, the trailer 300 will be ready to assist in pushing in the future (e.g., when the next hill is encountered). In some arrangements, the batteries 351, supercapacitors 352, and/or other power source(s) 350 of the trailer 300 can be parasitically charged using the battery 260 and/or other power sources of the main vehicle 200. In some arrangements, the batteries 351, supercapacitors 352, and/or other power source(s) 350 of the trailer 300 can be operatively connected to receive electrical energy from the battery 260 and/or other power sources of the main vehicle 200.

Such parasitic charging triggers can be detected based on sensor data acquired by the sensor(s) 330 and/or the sensor(s) 230. Another example of a parasitic charging trigger is a user command, which can be provided on the input interface(s) 240, which can be located, for example, within the cabin of the main vehicle 200. The user command can indicate that parasitic charging of the batteries 351 supercapacitors 352, and/or other power source(s) 350 of the trailer 300 should be performed.

The trailer module(s) 370 can cause, directly or indirectly, the various actions or functions described above to be implemented. As used herein, "cause" or "causing" means to make, force, compel, direct, command, instruct, and/or enable an event or action to occur or at least be in a state where such event or action may occur, either in a direct or indirect manner. The trailer module(s) 370 can execute various trailer functions and/or to transmit data to, receive data from, interact with, and/or control the trailer 300 or one or more elements, components, or systems thereof.

In some arrangements, the trailer module(s) 370 can be configured to detect only one particular type of trailer-related trigger. For example, the trailer module(s) 370 can be configured to detect drive activation trigger(s) only, energy recovery trigger(s) only, or parasitic charging trigger(s) only. In some arrangements, the trailer module(s) 370 can be configured to detect more than one trailer-related trigger. For instance, the trailer module(s) 370 can be configured to detect two of the following trailer-related triggers: drive activation trigger(s), energy recovery trigger(s), and parasitic charging trigger(s). In some arrangements, the trailer module(s) 370 can be configured to detect drive activation trigger(s), energy recovery trigger(s), and parasitic charging trigger(s). The trailer-related triggers can be detected based on sensor data, user inputs, and/or any other data or input. The trailer module(s) 370 can be configured to compare data and/or inputs relative to one or more predetermined standards to detect a trailer-related trigger. The trailer module(s) 370 can be configured to analyze data and/or inputs to identify a trailer-related trigger condition.

Now that the various potential systems, devices, elements and/or components of the main vehicle 200 and the trailer 300 have been described, various methods will now be described. Various possible steps of such methods will now be described. The methods described may be applicable to the arrangements described above in relation to FIGS. 1-3, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 4:
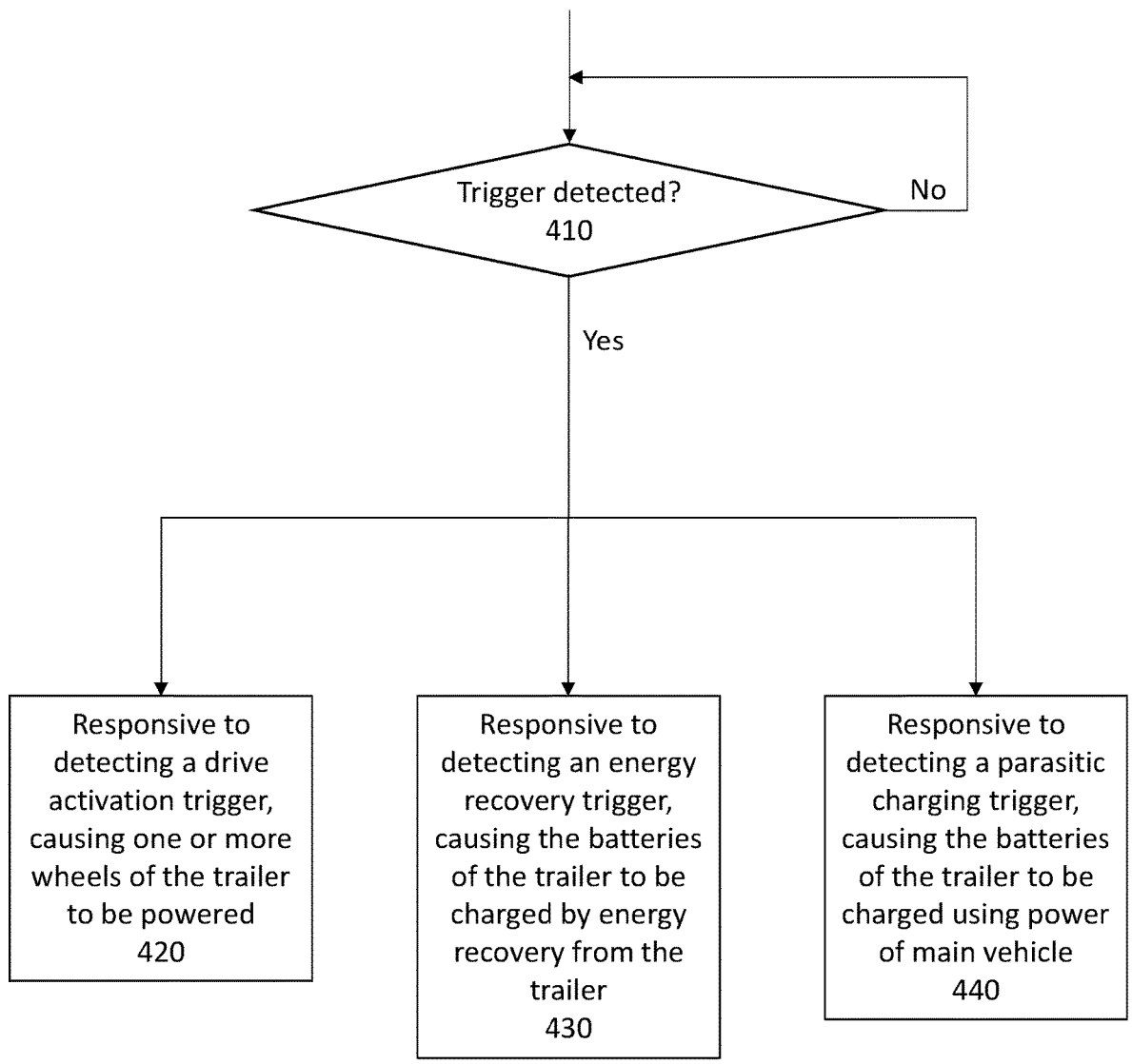
FIG. 4 is an example of a method for a trailer with selectively powered wheels, energy recovery, and/or parasitic charging.

Referring now to FIG. 4, an example of a method 400 is shown. At block 410, it can be determined whether a trailer-related trigger has been detected. The trailer-related trigger can be a drive activation trigger, an energy recovery trigger, or a parasitic charging trigger. While this method 400 will be described in connection with these three trailer-related triggers, it will be understood that arrangements described herein can be directed to methods that include any subset of these trailer-related triggers. The trailer-related trigger can be detected by the trailer module(s) 370, the processor(s) 310, and/or one or more sensor(s) 330. As noted above, a trailer-related trigger can be detected based on, for example, data acquired by the sensor(s) 330, the sensor(s) 230, and/or map data or based on a user input (e.g., a command).

If a trailer-related trigger is not detected, the method 400 can end, return to block 410, or proceed to some other block. However, if trailer-related trigger is detected, then the method can proceed to block 420, block 430, or block 440, depending on the type of the trigger detected. Each will be described in turn below.

At block 420, responsive to detecting a drive activation trigger, one or more wheels 304 of the trailer 300 can be caused to be powered. Such causing can be implemented in any suitable manner. For instance, in one or more arrangements, the processor(s) 310 and/or the trailer module(s) 370 can activate the motor(s) 360 by allowing electrical energy from the batteries 351 supercapacitors 352, and/or other power source(s) 350 to be supplied to the motor(s) 360. The power of the motor(s) 360 can be transferred to the wheel(s) 304 in any suitable manner, now known or later developed. As a result, extra pushing power (torque) is provided to the wheel(s) 304 to assist the trailer 300 and, thus, the main vehicle 200 in moving forward, such as up and over a hill or accelerating from a stop.

At block 430, responsive to detecting an energy recovery trigger, the batteries 351, supercapacitors 352, and/or other power source(s) 350 of the trailer 300 can be caused to be charged by energy recovery from the trailer 300. Such causing can be implemented in any suitable manner. For instance, in one or more arrangements, the processor(s) 310 and/or the trailer module(s) 370 can deactivate the motor(s) 360 and cause the motor(s) 360 to act as a generator. The electrical energy generated by the motor(s) 360 can be used to charge the batteries 351, supercapacitors 352, and/or other power source(s) 350 of the trailer 300. As a result, the batteries 351, supercapacitors 352, and/or other power source(s) 350 can be ready to supply electrical energy to the motor(s) 360 for when extra pushing power is needed in the future.

At block 440, responsive to detecting a parasitic charging trigger, the batteries 351, supercapacitors 352, and/or other power source(s) 350 of the trailer 300 can be caused to be charged using power of the main vehicle 200. Such causing can be implemented in any suitable manner. For instance, in one or more arrangements, the processor(s) 310 and/or the trailer module(s) 370 can divert a portion of the power generated and/or stored by the main vehicle 200 to charge or "top off" the batteries 351, supercapacitors 352, and/or other power source(s) 350 of the trailer 300. As a result, the batteries 351, supercapacitors 352, and/or other power source(s) 350 can be ready to supply electrical energy to the motor(s) 360 for any future use.

After block 420, block 430, or block 440, the method 400 can end. Alternatively, the method 400 can return to block 410 or some other block. The method 400 can be performed continuously, periodically, irregularly, randomly, or responsive to a condition, event, or input.

It will be appreciated that arrangements described herein can provide numerous benefits, including one or more of the benefits mentioned herein. For example, arrangements described herein can increase the average speed of the main vehicle, which, in turn, would not only increase fuel mileage but reduce transit times. Further, arrangements described herein can reduce the load of the brakes of the main vehicle. As a result, the life of the brakes can be extended, which can lead to significant cost savings for truck operators. Still further, arrangements described herein can help to ensure that the trailer is ready to assist in pushing when needed. Arrangements described herein can use power from the main vehicle without significantly affecting the performance of the main vehicle.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially horizontal" means exactly horizontal and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In at least some instances, "slight variations therefrom" can also include being within normal manufacturing tolerances.

Aspects herein can be embodied in other forms and/or combinations without departing from the spirit or essential attributes thereof. Thus, it will of course be understood that embodiments are not limited to the specific details described herein, which are given by way of example only, and that various modifications and alternations are possible within the scope of this specification.

What is claimed is:

1. A trailer comprising:
   one or more power sources;
   one or more motors operatively connected to receive electrical energy from the one or more power sources;
   one or more wheels, the one or more wheels being operatively connected to the one or more motors for selectively powering the one or more wheels;
   one or more processors operatively connected to the one or more motors, the one or more processors being configured to:
      detect a parasitic charging trigger, the parasitic charging trigger being when the trailer is moving on a substantially horizontal surface; and
      responsive to detecting a parasitic charging trigger, cause the one or more power sources to be charged using electrical energy from a main vehicle operatively connected to the trailer.

2. The trailer of claim 1, wherein the one or more power sources includes one or more batteries.

3. The trailer of claim 1, wherein the one or more power sources includes one or more supercapacitors.

4. The trailer of claim 1, wherein the one or more wheels includes at least one pair of wheels.

5. The trailer of claim 4, wherein the at least one pair of wheels includes a rearmost pair of wheels.

6. The trailer of claim 1, further including one or more sensors, wherein the one or more sensors are operatively connected to the one or more processors, the one or more processors being configured to detect the parasitic charging trigger based on data acquired by the one or more sensors.

7. The trailer of claim 1, further including one or more input interfaces, wherein the one or more input interfaces are operatively connected to the one or more processors, the one or more processors being configured to detect the parasitic charging trigger based on a user input provided on the one or more input interfaces.

8. A method for a trailer, the trailer including one or more power sources, one or more motors operatively connected to receive electrical energy from the one or more power sources, and one or more wheels operatively connected to the one or more motors for selectively powering the one or more wheels, the method comprising:
  detecting a parasitic charging trigger, the parasitic charging trigger being when the trailer is moving on a substantially horizontal surface; and
  responsive to detecting a parasitic charging trigger, causing the one or more power sources to be charged using electrical energy from a main vehicle operatively connected to the trailer.

* * * * *